United States Patent [19]

Cotic

[11] 4,306,155

[45] Dec. 15, 1981

[54] GAS-FILLED X-RAY DETECTOR WITH IMPROVED WINDOW

[75] Inventor: Dennis J. Cotic, Waukesha, Wis.

[73] Assignee: General Electric Company, Schenectady, N.Y.

[21] Appl. No.: 137,321

[22] Filed: Apr. 4, 1980

[51] Int. Cl.$^{3}$ .................................................. G01T 1/18

[52] U.S. Cl. .................................. 250/385; 250/445 T; 313/93; 313/220

[58] Field of Search ......................... 250/374, 375, 385; 313/59, 93, 220

[56] References Cited

U.S. PATENT DOCUMENTS 3,366,790 1/1968 Zagorites et al. ...................... 313/93
4,161,655 7/1979 Cotic et al. .......................... 250/385

*Primary Examiner*—Davis L. Willis

*Attorney, Agent, or Firm*—Wheeler, House, Fuller & Hohenfeldt

[57] ABSTRACT

A multicell x-ray detector of the gas-filled ionization type includes a metal body in which the front, rear, end and bottom walls together with a sealed cover define a channel in which there is a row of spaced apart electrode plates which define cells in which ionization events and resultant analog signals are produced in response to absorption of x-ray photons by the gas. The x-ray entrance window is formed in the front wall and extends over substantially the length of the channel. The window has a curved cross section which permits restriction of its internal stresses to tensile stresses so its thickness and, hence, its x-ray absorption is minimized. The edges of the electrode plates which are presented toward the window are curved to be concentric with and slightly spaced from the window.

7 Claims, 7 Drawing Figures

GAS-FILLED X-RAY DETECTOR WITH IMPROVED WINDOW

This invention relates to a multi-cell detector for ionizing radiation such as x-radiation. The improved detector described herein was designed primarily for detecting photon intensity and energy distribution across a broad beam of x-rays and it is especially useful in x-ray computerized axial tomography systems.

In a typical computerized tomography system, the beam from an x-ray tube is collimated into a thin diverging or fan-shaped beam which penetrates the human body being examined and falls on an array of detector cells such that photon intensity and energy distribution across the beam can be detected and resolved spatially. Each active detector cell comprises at least a pair of parallel thin metal plates which serve as electrodes. The plates are in a housing which is filled with high pressure and highly x-ray absorbent stable gas such as xenon or a polyatomic gas. The individual detector cells are juxtaposed so that the x-ray photons distributed across the x-ray beam after emerging from the body are detected simultaneously. Analog signals due to ionization of the gas in the respective cells and corresponding with x-ray absorption along each ray path in the beam at the instant of detection are conducted from the electrodes to a data acquisition system. The x-ray tube and detector are rotated or scanned around the body under examination jointly and groups of signals are derived at successive angles of rotation and when signals are taken it constitutes an x-ray view. The discrete analog signals which correspond with attenuation along the ray paths for each view, are converted to digital signals and processed in a computer which is controlled by a suitable algorithm to produce picture element signals representative of x-ray absorption or attenuation of each small volume element in the body through which the x-ray beam passes. These signals are used by a display controller which controls a television monitor to display an axial view of the thin layer in the body which has been scanned transversely. The analog signals are generally in the low nanoampere range. Careful attention must be given to maintaining an adequate signal-to-noise ratio. One of the causes of an undesirably low ratio and, hence, of poorer contrast resolution in the displayed image is that a lot of the low energy x-ray photons are absorbed in the x-ray entrance window of the detector.

The basic features of a high pressure gas-filled x-ray detector to which the improvement in the x-ray transmissive window described herein are applicable may be seen in U.S. Pat. No. 4,161,655 which is incorporated herein by reference. The detector in the cited patent comprises a housing having a bottom, ends and front and rear walls which define a channel in which the juxtaposed electrode plates which create the individual x-ray detecting cells is disposed. A metal cover is bolted onto the body to close the channel and there are sealing means, such as a gasket, interposed between the cover and housing body. The housing is filled with atomic number gas such as xenon, preferably, at a pressure in the range of 10 to 50 atmospheres but about 25 atmospheres is commonly used for x-ray photons having an energy range of about 40 to 120 kev. The front wall of the detector is reduced in thickness along its length to define a window for the x-ray beam to penetrate into the gas-filled housing and for the rays of the beam to produce independent ionizing events in the individual cells. Usually aluminum is used for the detector housing because of its relatively high x-ray transmissive properties compared with higher atomic number elements which might have greater strength. Prior practice has been to make the cross section of the window straight, that is, with its front and rear or its x-ray input and output surfaces parallel to each other. The window height must be great enough for the thin diverging x-ray beam, usually about 10 mm thick, to penetrate the window without interference by adjacent portions of the detector housing. In prior art computerized tomography multicell x-ray detectors, made of aluminum and with straight faced windows, window height is typically 1.0 inch to accommodate flaring out of the 10 mm thick x-ray beam at a distance from the x-ray tube, the thinnest window which could be used and still have an adequate margin of safety with gas pressure on the order of 25 atmospheres was 0.133 of an inch or 133 mils where a mil is equal to one one-thousandth of an inch. It is well-known to stress analysts that as window height is increased, window thickness must be increased to keep its deflection and the safety factor within acceptable limits. One reason why straight-faced windows must be so inordinately thick at the expense of high x-ray absorption loses is that such windows are subjected primarily to bending stress by the gas pressure. For beam members, such as the window, bending induced stresses are higher than tensile induced stresses for a given load magnitude. The object is to reduce bending stresses at the expense of tensile stresses. Any window bending, of course, increases the gap thickness between the edges of the electrode plates and window and, hence, results in signal anomalies and greater x-ray loss in the gas before the photons enter the spaces between electrode plates.

In computerized axial tomography apparatus the x-ray beam emitted by the x-ray tube contains a spectrum of photon energies in substantially a zero to 120 kiloelectron volt range. The x-ray beam is filtered before it penetrates into the body to remove low energy photons which would only be absorbed by the body and would not contribute to produce signals which correspond with attenuation of the x-ray beam by the body. Thus, after filtration, the primary x-ray beam, that is, the beam before it penetrates the body, has a photon energy spectrum usually of about 40 to 120 kiloelectron volts (kev) and the spectral content of the beam falling on the detector winding is about the same although the photon intensity is attenuated by the body. When the detector window consists of aluminum and is straight or flat as is customary and when the thickness requirement for an adequate safety factor is obtained, it has been found that as much as 30 percent of the average energy photons at about 80 kev are absorbed in the window which means that as much as 30 percent of the useful signal information is lost. Because of the loss of the normal distribution of photon energies, contrast resolution in the reconstructed image is degraded and tissue zones in the body which have small density differences between them cannot be perceived in the displayed image. Therefore, less information is provided to the diagnostician.

A solution to the problem of excessive x-ray absorption in the window, on first impression, would appear to be to reduce window thickness and height to the lowest tolerable dimensions consistent with the required safety factor. It has been found, however, that in any case where the thickness of a straight or planar window is minimized, relatively minor but significant and unpredictable deflection of the window occurs when it is subjected to the high gas pressure which must be used in detectors of this type. This creates other problems. One results from the fact that, as alluded to briefly above, the edges of the electrode plates must necessarily be very close to the inside surface of the window. The gap between the window and electrode plate edges is occupied by x-ray absorbing gas which means that x-ray photons which only produce useful analog output signals if they are absorbed between the electrode plates may be partially absorbed in the gas before they enter between the electrode plates. This tends to reduce contrast resolution in the image. Deflection of the window also alters the thickness of the gas layer non-uniformly and unpredictably along the length of the window and along the array of cells, so detection precision suffers. Moreover, gas ions which should enter between one pair of electrode plates may drift in the gap and go between another pair to produce what might be characterized as noise so that the signal-to-noise ratio falls.

SUMMARY OF THE INVENTION

An object of the present invention is to provide an x-ray detector which has the thinnest and least x-ray absorbing window and yet has the lowest possible internal stresses and least amount of deflection.

In accordance with the invention, this general object is achieved by eliminating bending stresses in the window and restricting the stresses to pure membrane or tensile stress. In particular, this object is achieved with a window that has a curved cross section in its height direction, that is, transversely to its length. In addition, the edges of the electrode plates within the detector housing are curved convexly so they complement the concave curve on the internal surface of the window such that a small and uniform gas-filled gap can be maintained between the detector electrode plates and the window.

One benefit of the new curved window design is that it permits use of low x-ray attenuation and relatively weak but light metals such as magnesium and beryllium as well as aluminum for the window.

How the foregoing and other more specific objects of the invention are achieved will be evident in the more detailed description of a preferred embodiment of the invention which will now be set forth in reference to the drawing.

DESCRIPTION OF A PREFERRED EMBODIMENT

Figure 1:
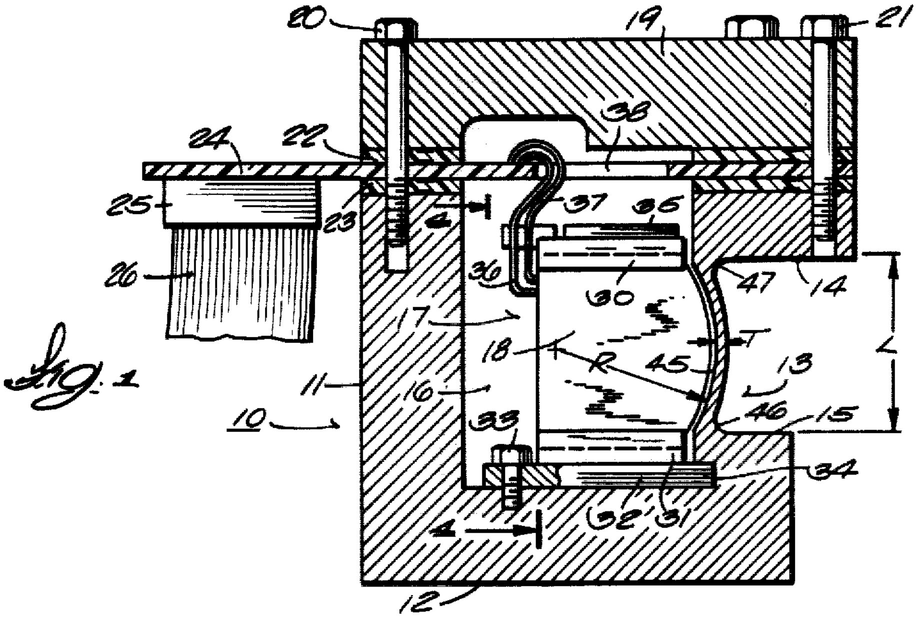
FIG. 1 is a vertical section of a multicell x-ray detector as viewed in the direction of the line 1—1 in FIG. 2.

The detector shown in FIG. 1 is comprised of a metal body 10 which has a rear wall 11, a bottom wall 12 and a front wall in which the new curved x-ray permeable window 13 is formed. The window may be characterized as being concave on its inside and convex on its outside, or in other words it is concavo-convex. The window is overhung by a flange 14 which, in conjunction with a lower flange 15 defines a window opening whose height, L, is substantially equal to the height of the curved window. The window height must be somewhat greater than the thickness of the incoming fan-shaped x-ray beam because any impingement of the x-ray beam on the housing body above and below the window could result in some useful radiation not being detected. Housing body 10 has an internal channel 16 in which the array 17 of juxtaposed electrode plates such as the one marked 18 are arranged along the width of the detector. The detector body 10 has end walls which close the ends of the channel and enable it to be filled with high pressure x-ray absorbing and ionizing gas such as monatomic high atomic number xenon or other suitable inert and ionizable gas.

Figure 3:
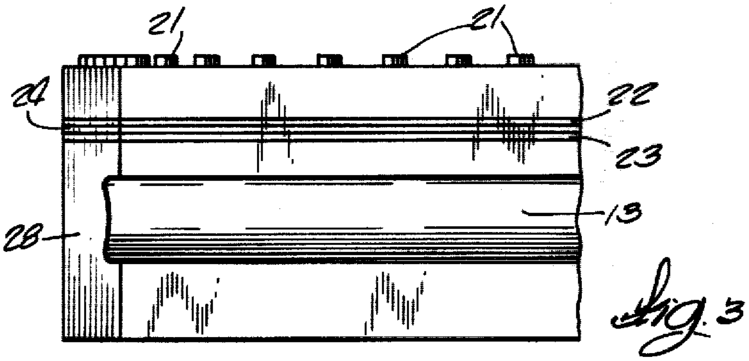
FIG. 3 is a partial front elevation view of the detector shown in the preceding figures.

Detector 10 has a metal cover 19 secured to the top of detector body 11 by means of machine screws such as those marked 20 and 21. As can be seen in FIGS. 1 and 3, there are two gasket assemblies 22 and 23 interposed between cover 19 and the top surface of body 10 and there is a printed circuit board interposed between the gasket assemblies. The printed circuit board has thin foil conductors on it, not visible, which lead to a connector 25 to which a flat ribbon cable 26 is connected. The conductors of cable 26 are for transmitting to the data acquisition system, not shown, the analog signals which result from ionizing events in the individual detector cells and are representative of x-ray photon intensity distribution across the fan-shaped x-ray beam after it has emerged from the body being examined.

Figure 2:
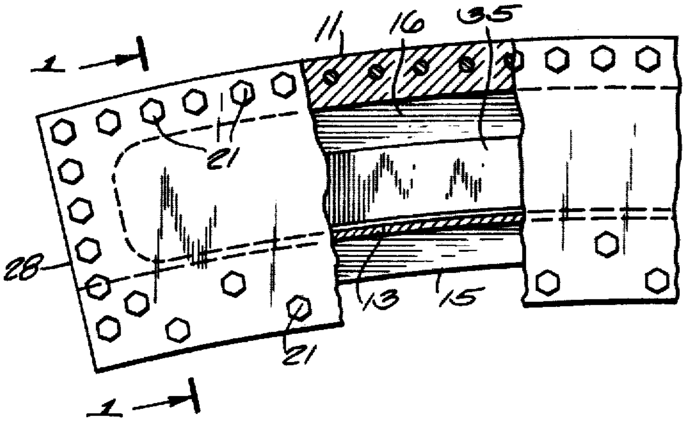
FIG. 2 is a partial plan view of the detector in FIG. 1 with part of the cover of the detector body broken away to show the interior thereof.

As can be seen in FIGS. 2 and 3, channel 16 within the detector body is terminated by its end walls, one of which is visible and is marked 28. The fittings for evacuating and filling the detector body with high pressure gas are not shown in the drawing.

Figure 4:
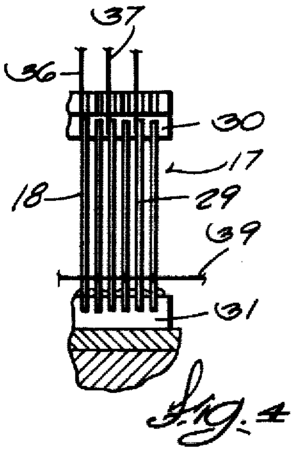
FIG. 4 shows some of the electrode plates within the detector housing as viewed in the direction of the line 4—4 in FIG. 1.

FIGS. 1 and 4 show that the juxtaposed and spaced apart electrode plates which define the gas-filled ionization spaces or cells, such as the one marked 29, are secured within slots in upper and lower insulating strips 30 and 31. The assembly of plates and strips can be anchored in channel 16 in various ways. In this example the lower insulating strip is bonded to a foot plate 32 which is secured to the bottom of the detector housing by means of machine screws such as the one marked 33. Foot plate 32 has a toe 34 which extends into a complementarily shaped groove in the housing bottom. This assures that the electrode plates 17 will be secured in a reproducible position in each detector. The upper insulating strip 30 is grooved to accommodate the upper edges of the electrode plates and is bonded to a metal bar 35 which is anchored at its ends in the housing body 11 by means which are not shown. One pair of illustrative lead wires from electrode plates are marked 36 and 37 in FIG. 1 and are shown to pass through a hole 38 in printed circuit board 24 for enabling them to be connected to the foil conductors on the board from its top. Alternate electrode plates are connected in common to a conductor 39 as can be seen in FIG. 4.

Except for the curved window 13, the basic features of the detector described above are similar to those of the detector which is described in greater detail in cited U.S. Pat. No. 4,161,655.

In the new design, as shown in FIG. 1, the front edges of the electrode plates in the array 17, such as the one marked 18, are curved where they are presented toward the concave side of the window and are concentric with the curvature of window 13. There is also a small gap 45 between the edges of the electrode plates and the inner surface of window 13. It is important that this gap be kept as small and uniform as possible since the gas within the gap absorbs some of the x-ray photons which would otherwise contribute to the useful analog signals resulting from ionization of gas between the electrode plates.

Window 13 can be formed by using a convex milling tool, not shown, which has a curvature corresponding with the radius of curvature of the inside surface of window 13 in conjunction with a generally concave tool, not shown, which has a radius corresponding with the radius of curvature of the outside surface of the window. The tool used to cut the outside of the window has a height equal to the dimension L or window height which is indicated in FIG. 1. The outside tool also forms corners 46 and 46 with radii where the lower and upper edges of the curved window 13 merge with the detector body. Radii 46 and 47 provide for gradual transition or relief of stresses to thereby decrease notch sensitivity of the metal used for the detector body.

The stress and deflection characteristics of the prior art straight window and the new curved window is expressed by the following approximate equations which govern these characteristics:

| Equations Governing Window Stresses | |
|---|---|
| Straight Window | Curved Window |
| $S_t = K_b \frac{PL^2}{2T^2} + K_t \frac{PX}{2T}$ | $S_t = K_t \left( \frac{R^2}{T + T^2/2} + 1 \right) P$ |
| **Equations Governing Window Deflection** | |
| Straight Window | Curved Window |
| $D = \frac{PL^4}{32ET^3}$ | $D = \frac{PR^2}{ET} \left( 1 - \frac{V}{2} \right)$ |

Where:
P = internal pressure (psi)
E = modulus of elasticity (stiffness)
T = window thickness
L = window height
$K_b$ = notch sensitivity for bending (1.3) for aluminum
$K_t$ = notch sensitivity for tension (1.6) for aluminum
R = radius of curvature of window (fixed for any detector body size)
V = Poissons ratio (.03) for aluminum
X = transverse depth of internal channel 16 in detector body 11
$S_t$ = tensile stress (psi)
D = deflection The equations show that for a straight window, the stress increases inversely with the square of window thickness T whereas for the curved window stress is inversely porportional to thickness. For the straight window, tensile stress $S_t$ in pounds per square inch is proportional to the square of window height. Stress is proportional to the internal pressure in the detector housing for both the straight window and curved window. This is shown in the FIG. 5 graphs.

Figure 5:
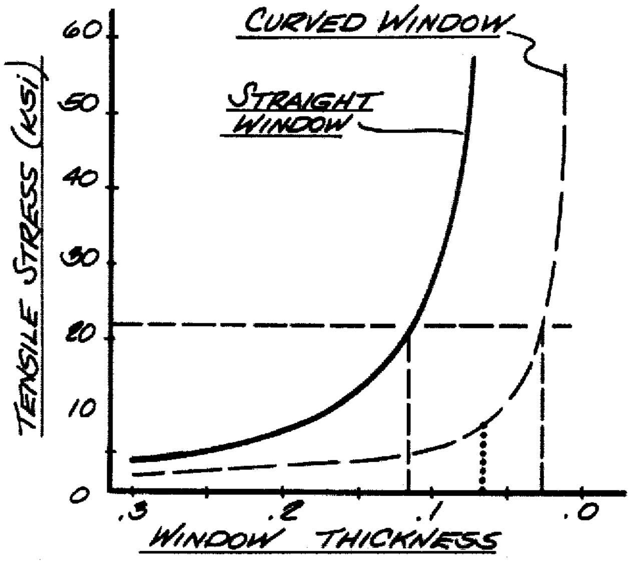
FIG. 5 is a graph of tensile stress (in kilopounds per square inch, KSI) versus window thickness for a straight window and a curved window.

FIG. 5 is a graph of tensile stress in kilopounds per square inch (KSI) versus window thickness for a straight and parallel faced prior art window and for a curved window. The radius of curvature for the new curved window is such that its internal stresses are substantially purely tensile and advantage is taken of the fact that any of the proposed window metals have greater ultimate strength in tension than in bending for the same magnitude of loads. Because straight windows necessarily have bending stresses as well as tensile stresses developed in them, they will deflect more and have a lower yield strength than a curved window of equal height and thickness.

The horizontal dashed line in FIG. 5 is the stress, illustrated to be about 23 KSI, which results in a safety factor of about 2 for a curved and a straight window where the factor is determined relative to the yield stress of aluminum. The straight and curved windows are assumed to have the same height. One may see that to obtain a required safety factor of at least 2, a straight window would have to be at about 0.13 of an inch thick but a curved window only needs to be about 0.035 of an inch thick. This is a factor of about 4 and is a very significant difference insofar as x-ray losses especially losses in the lower energy part of the spectrum are concerned. In an actual design, however, by way of example, a thickness of 65 mils or 0.065 of an inch is used, as indicated by the dotted ordinate, just to obtain an even greater safety factor.

Insofar as deflection is concerned, the equations show that for the straight window, deflection increases inversely to the cube of the thickness and for the curved window deflection increases inversely proportional to thickness. For the straight window, deflection increases as the fourth power of window height, L, whereas for the curved window deflection increases only as the square of window radius of curvature. A graphic comparison of the deflections of straight and curved windows is shown in FIG. 6.

Figure 6:
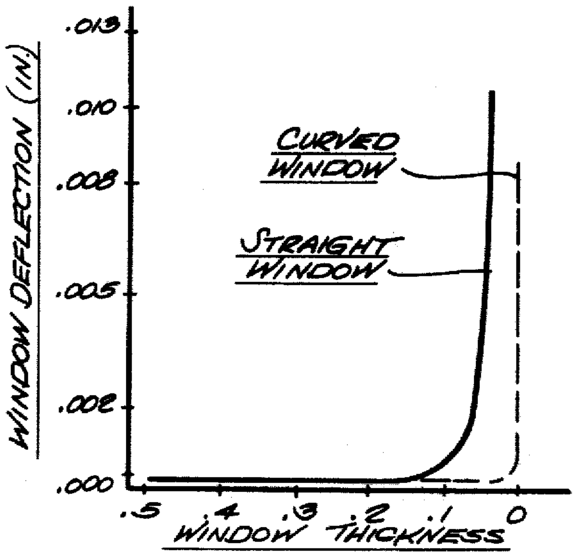
FIG. 6 is a graph of detector window deflection (in decimal fractions of an inch) versus window thickness for a straight and a curved window.

FIG. 6 plots window deflection in decimal fractions of an inch versus thickness for illustrative aluminum curved and straight windows of the same height. One may see that deflection of the curved window is insignificant until window thickness is reduced way beyond the thickness at which a straight window would deflect so much that it could not be used.

As the graphs shown, in general, for the same window thickness, the stress in the curved window is only about 1/5 of the straight window and deflection of the curved window is about two orders of magnitude less than deflection for the straight window.

Figure 7:
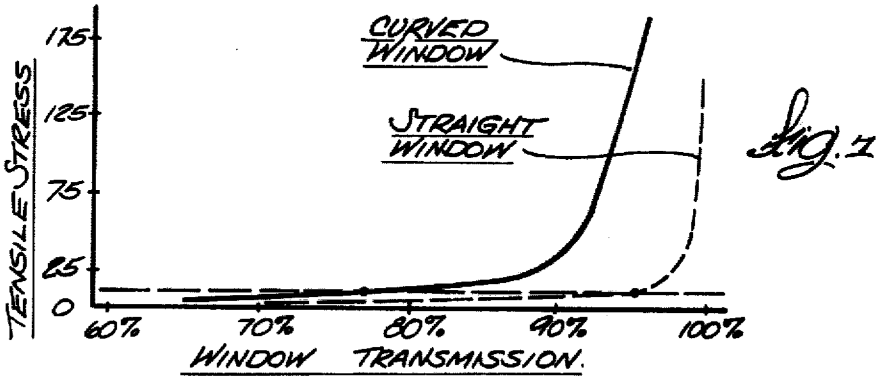
FIG. 7 is a graph of tensile stress in KSI versus x-ray transmission for a straight and a curved window.

FIG. 7 is a plot of tensile stress in the window versus percent of x-ray photon transmission by the window for a new curved window and a straight window, both being aluminum and having the same height. The dashed horizontal line represents the stress in KSI at which there is a safety factor of 5 for illustrative purposes. As the graphs show, if a straight window is designed for a safety factor of 4 it will transmit only about 78 percent of incoming x-ray intensity whereas a curved window, in accordance with the invention, with the same safety factor will transmit 98 percent of the incoming x-ray intensity. In both cases, transmissibility is calculated on the basis of the average x-ray photon energy being about 80 kev in a spectrum of 40 to 120 kev approximately.

Materials that are used for the window should have high x-ray transmission for predominant 60 to 100 kev x-ray photons, high tensile and ultimate strength, high stiffness or modulus of elasticity, low notch sensitivity, low gas diffusion at 25 atmospheres of pressure, no degradation as a result of x-ray exposure, ready machinability and they should be stable under atmospheric conditions. When all factors are considered, aluminum and magnesium are preferred materials out of which the window should be made and, as a practical matter, the preferred material out of which the detector body 10 should also be made. Beryllium is also a suitable material insofar as strength and x-ray transmissibility are concerned but it is brittle, costly and toxic so special machining facilities are required for its use. A table comparing the properties of beryllium, magnesium and aluminum is as follows:

| | Yield Stress (KSI) | Ultimate Stress (KSI) | Modulus of Elasticity | Relative Transmission |
|---|---|---|---|---|
| Beryllium | 40 | 60 | $42 \times 10^6$ | 119% |
| Magnesium | 38 | 50 | $6 \times 10^6$ | 114% |
| Aluminum | 35 | 38 | $10 \times 10^6$ | 100% |

It has been determined that the advantageously high relative transmission of beryllium over the other metals diminishes rapidly as the window gets thinner. For instance, for a thin window of about 0.040 of an inch or less, the increased transmission of beryllium over magnesium is only about 0.6 percent. One disadvantage of magnesium is that its modulus of elasticity is ½ that of aluminum and 1/6 that of beryllium. However, as can be seen, use of a curved window minimizes dependence of deflection on modulus of elasticity. As the following table shows, for a range of window thicknesses and a given window height, deflection of the curved window is in the range of about 1/12 to 1/90 that of a straight window.

The following table is for showing the improved x-ray transmissibility and reduced deflection for a curved window compared to a prior art straight window. The data is based on use of an aluminum (type 6061T6) window one inch high in both cases for the sake of illustration. The data for a similar magnesium window is not reproduced except that in the last column the percent of transmission of x-ray photons, having an average energy of 80 kev, is given for magnesium to allow comparison with aluminum windows having the thicknesses which are listed. In this table, the safety factors (S.F.) are calculated relative to tensile yield strength. Deflection is expressed in thousandths of an inch (mils). Window thickness (T) is expressed in decimal fractions of an inch (in.).

As assumption is made that any window used at around 25 atmospheres of pressure will have a safety factor of at least 2.

TABLE

| Thickness | Straight Window | | Curved Window | | % Transmission | |
|---|---|---|---|---|---|---|
| (T) (in.) | S.F. | Deflection (mils) | S.F. | Deflection (mils) | Al | Mg |
| .25 | 6.3 | .073 | 13.7 | .13 | 71.0 | 81.0 |
| .20 | 4.3 | .14 | 11.3 | .165 | 76.0 | 85.0 |
| .15 | 2.6 | .34 | 8.7 | .21 | 81.4 | 88.2 |
| .133 | 2.0 | .52 | 7.6 | .25 | 83.7 | 89.7 |
| .125 | 1.9 | .58 | 7.4 | .263 | 84.3 | 90.0 |
| .10 | 1.3 | 1.14 | 6.0 | .34 | 87.2 | 92.0 |
| .095 | 1.1 | 1.33 | 5.7 | .35 | 87.8 | 92.3 |
| .090 | 1.0 | 1.56 | 5.4 | .37 | 88.4 | 92.7 |
| .065 | | 4.2 | 4.0 | .51 | 91.5 | 94.7 |
| .050 | | 9.1 | 3.0 | .66 | 93.4 | 95.9 |
| .040 | | 17.8 | 2.5 | .82 | 94.7 | 96.8 |

TABLE-continued

| Thickness | Straight Window | | Curved Window | | % Transmission | |
|---|---|---|---|---|---|---|
| (T) (in.) | S.F. | Deflection (mils) | S.F. | Deflection (mils) | Al | Mg |
| .030 | | 42.3 | 1.9 | 1.10 | 96.0 | 97.5 |

The table permits some interesting comparisons. Look at the design where the safety factor for a straight 1 inch high aluminum window is 2.0 which is about the minimum that is considered permissible. A straight window must be 0.133 of an inch thick to get this safety factor. Deflection is more than desirable at 0.52 mils. For a curved window of the same 0.133 of an inch thickness the safety factor is a far larger than necessary 7.6 and deflection is 0.25 of a mil. X-ray transmissibility for this window is 83.7 percent for aluminum and 89.7 percent for magnesium which means that there is an x-ray intensity loss of about 16 percent and at least 10 percent, respectively, in the window itself. Deflection for the curved window is only about ½ as much as for the straight window.

Now look at the design where the safety factor for a curved 1 inch high window is about 2 or specifically 1.9 as the last entry in the table. The cured window can obtain this factor with only 0.030 of an inch thickness. Deflection is still tolerably low at 1.1 mils and x-ray transmissibility for aluminum is a very high 96.0 percent and for magnesium it is 97.5 percent.

In one commercial design, applicant is able to use the 0.065 inch thick curved window listed in the table for a window a little higher than one inch and yet have a safety factor of about 4 for aluminum and a little less for magnesium. As the table shows, x-ray transmission is still 91.5 percent and 94.7 percent, respectively. The range of thicknesses for detectors adapted for window heights and gas pressures used in computerized tomography is about 0.030 of an inch to 0.09 of an inch.

As briefly mentioned earlier in reference to FIG. 1, having the front edges of the electrode plates curved for being concentric with the curvature of the window 13 is an important feature of the invention. The radius of curvature R of the window, as can be seen in the stress equations for a curved window, will depend on the maximum tensile stress, $S_t$, permissible for the aluminum, magnesium or beryllium which has been chosen for the window. The length of the window arc is not significant since it depends on the height, L, of the window, but L does not enter into the calculation of $S_t$, where, in accordance with the invention, substantially the only stress present in the window is tensile. When R is established for the window, the radius of the electrode plate edges can be easily determined.

The thickness of the gas-filled gap 45 required depends on the clearance necessary between the electrode plates 17 and the window 13 and this is governed by the electrical and physical clearance tolerances required in any particular embodiment.

The foregoing detailed description of an embodiment of the new curved window detector has been given to enable those skilled in the art to practice the invention but the scope of the invention is to be determined by interpreting the claims which follow.

I claim:

1. An x-ray detector comprising a housing for being occupied by ionizable gas at a pressure of between 10 and 50 atmospheres and having bottom, rear and front walls defining an internal channel that extends lengthwise of the housing, an x-ray transmissive window formed in and integrally with said front wall, and extending in the lengthwise direction of the channel, an array of juxtaposed electrode elements disposed along said channel and spaced from each other to define a multiplicity of ionization cells, said elements being directed transversely to said lengthwise direction and corresponding edges of said elements being located adjacent said window for x-ray photons which permeate said window to pass between said elements, and means for closing said channel for maintenance of gas pressure in said housing:

the improvement wherein said window has a thickness substantially less than the wall in which it is formed and has a curved cross section which is concave on a side adjacent the electrode elements and convex on its opposite side, the radius of curvature of said window being such that the tensile stress developed in it by the force of said gas pressure is greater than that which would be developed in a correspondingly thick straight window and the bending stress is less than would be developed in said straight window.

2. The detector as in claim 1 wherein the metal comprising said window and the wall in which it is formed is any one metal selected from the group consisting of aluminum and magnesium.

3. The detector as in claim 2 wherein the thickness of said window is no less than 0.060 of an inch and no greater than 0.090 of an inch.

4. The detector as in claim 2, wherein said window is aluminum and has a thickness such that it will transmit at least 88 percent of impinging x-ray photons having an average energy of about 80 kev.

5. The detector as in claim 2 wherein said window is aluminum and has a thickness of about 0.065 of an inch such that it will transmit at least 91 percent of impinging x-ray photons having an average energy of about 80 kev.

6. The detector as in claim 2 wherein said window is magnesium and has a thickness such that it will transmit at least 92 percent of impinging x-ray photons having an average energy of about 80 kev.

7. The detector as in any of claims 1, 3, 4, 5 or 6 wherein said electrode elements are plates and the edges of said plates are curved and extend complementarily into the concavity of said window with a small gap remaining between said edges and said window.

* * * * *